United States Patent [19]

Canard et al.

[11] 4,420,582

[45] Dec. 13, 1983

[54] POLYMERIC MATRICES REINFORCED WITH HIGHLY DISPERSED SYNTHETIC ZEOLITIC PARTICULATES

[75] Inventors: Pierre Canard, Versailles; Bertrand Latourrette, Le Raincy; Gilbert Schorsch, Colombes, all of France

[73] Assignee: Rhone-Poulenc Industries, Paris, France

[21] Appl. No.: 271,956

[22] Filed: Jun. 9, 1981

[30] Foreign Application Priority Data

Jun. 9, 1980 [FR] France .............................. 80 12742

[51] Int. Cl.$^3$ .............................................. C08K 3/34
[52] U.S. Cl. .................................... 524/450; 524/584
[58] Field of Search ................... 524/450, 584, 606

[56] References Cited

U.S. PATENT DOCUMENTS

| | | | |
|---|---|---|---|
| 3,036,980 | 5/1962 | Dunham et al. | 524/450 |
| 3,236,806 | 2/1966 | Dunham | 524/450 |
| 3,258,439 | 6/1966 | Braun | 524/450 |
| 3,755,222 | 8/1973 | Gruber et al. | 524/450 |
| 3,894,983 | 7/1975 | Higbee | 524/450 |
| 3,953,565 | 4/1976 | Mizutani et al. | 524/450 |
| 4,250,081 | 2/1981 | Bode et al. | 524/450 |
| 4,293,458 | 10/1981 | Gruenberger et al. | 524/450 |

FOREIGN PATENT DOCUMENTS 42316 12/1981 European Pat. Off. ............ 524/450

OTHER PUBLICATIONS

Shimada; Chemical Abstracts; vol. 89; 1978; No. 89:216253v.

Primary Examiner—Lewis T. Jacobs
Attorney, Agent, or Firm—Burns, Doane, Swecker & Mathis

[57] ABSTRACT

High impact strength, improved bending modulus composites are comprised of a polymeric matrix, e.g., elastomer or synthetic polymer of polypropylene or polyamide type, said matrix having highly dispersed therein a reinforcing amount of relatively small synthetic zeolitic filler particulates, e.g., of types A, 4A and Na-P, and the mean size of the elementary particles thereof advantageously closely approximating those of the secondary particles.

12 Claims, 20 Drawing Figures

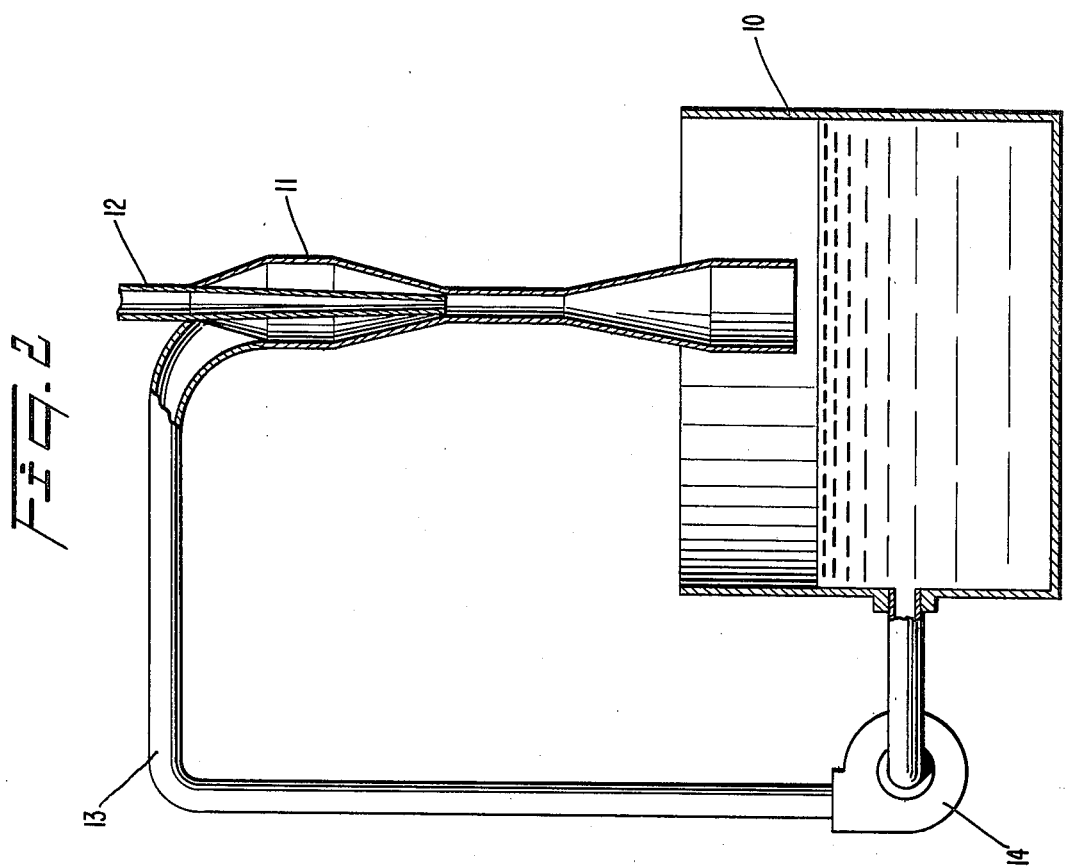
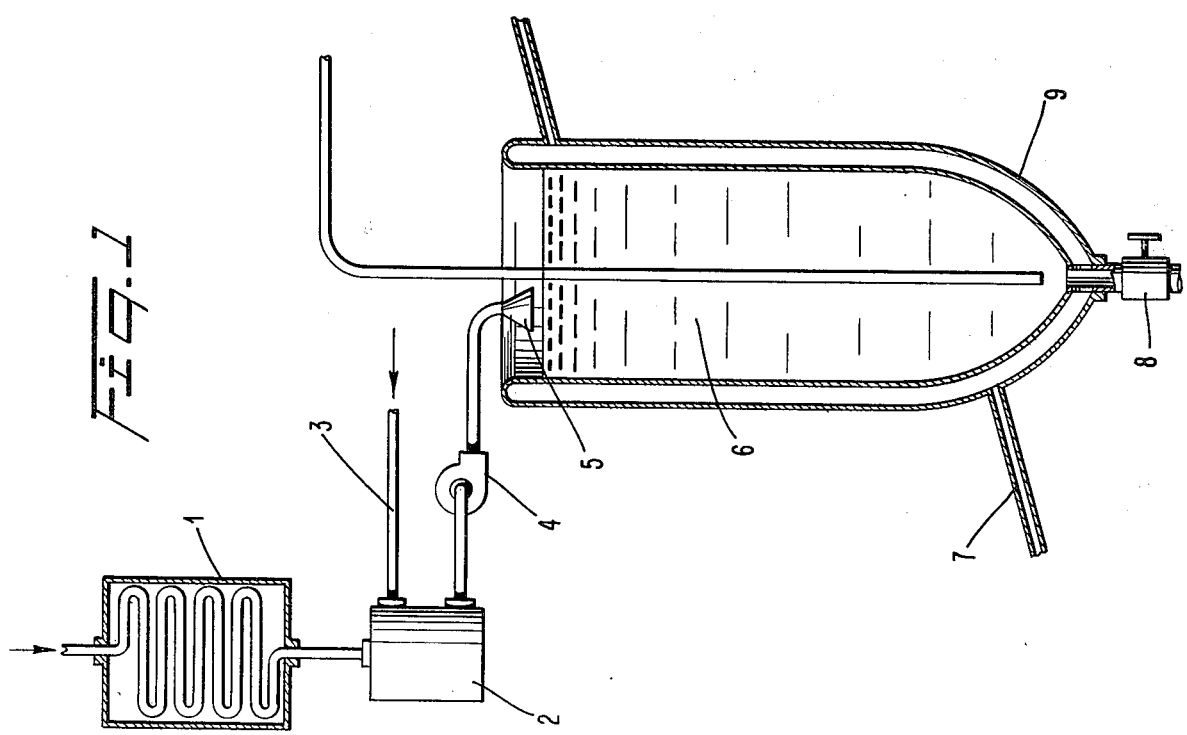

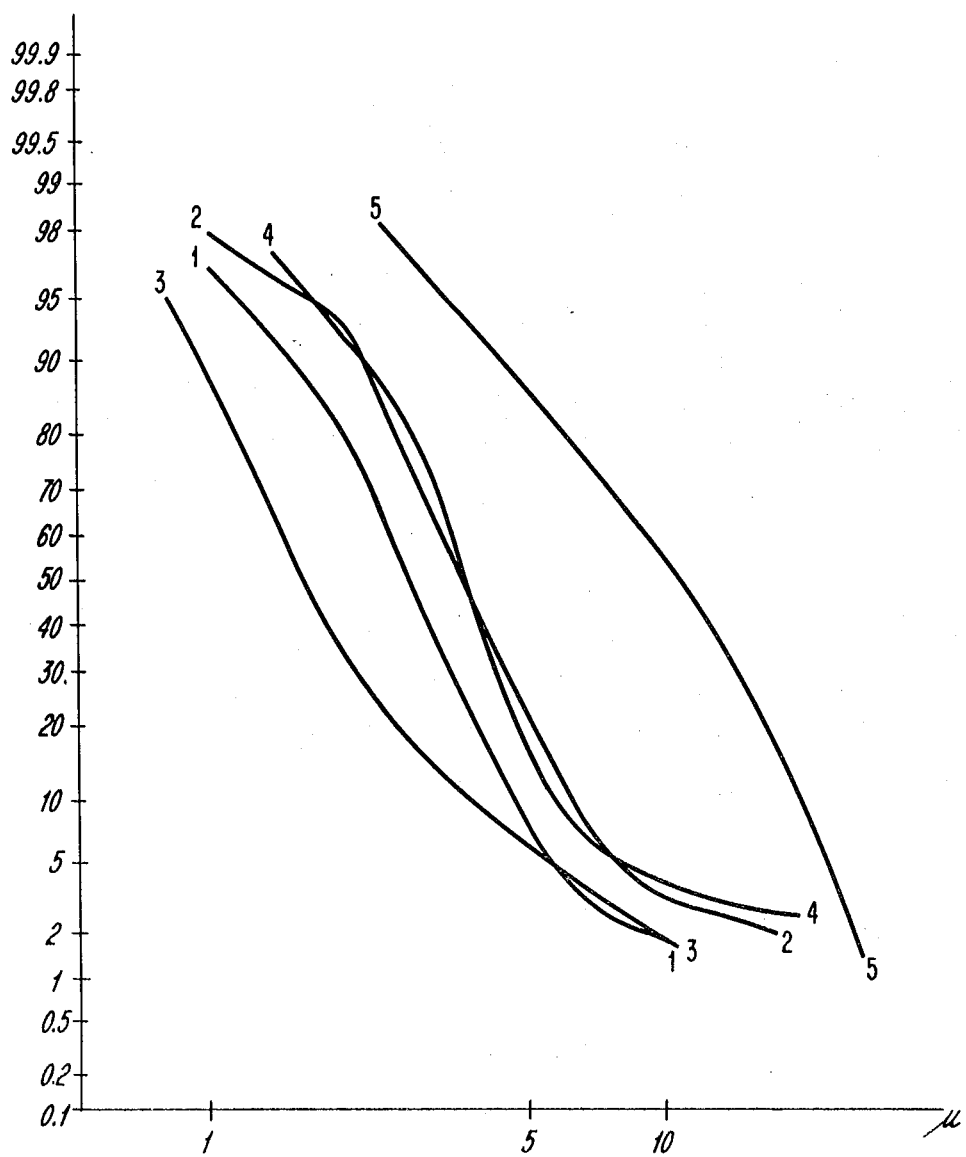

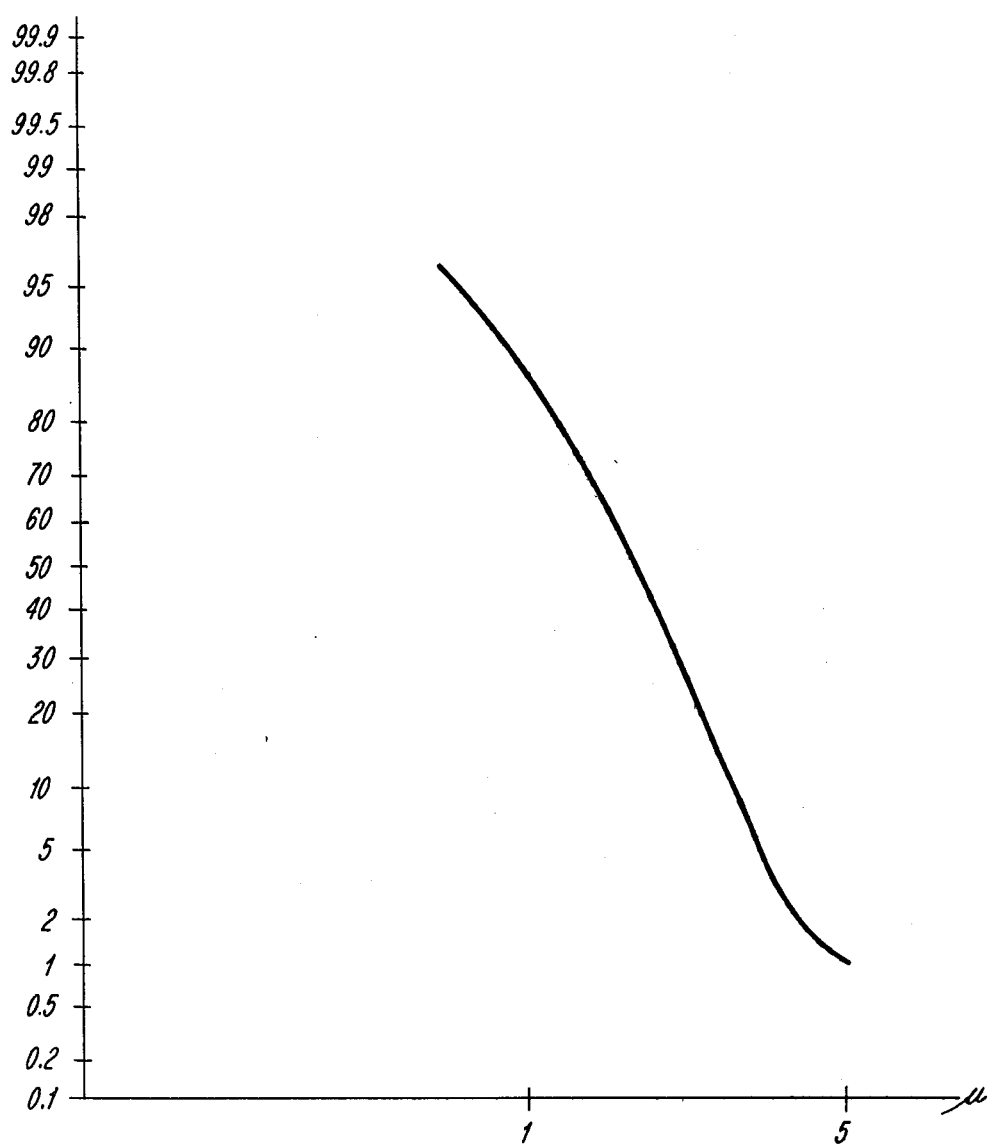

POLYMERIC MATRICES REINFORCED WITH HIGHLY DISPERSED SYNTHETIC ZEOLITIC PARTICULATES

BACKGROUND OF THE INVENTION

1. Field of the Invention

The present invention relates to novel synthetic zeolitic fillers having a high degree of dispersibility, and, more especially, to the use of such zeolites as reinforcing fillers for polymeric matrices.

2. Description of the Prior Art

It has long been known to utilize mineral fillers to improve or enhance certain properties of elastomeric polymer matrices in particular, and the plastics in general.

Unfortunately, the incorporation of, and reinforcement with, such fillers may suffer from two types of disadvantage, one being an economic disadvantage, if the cost of the filler is excessively high, and the other being a technical disadvantage, if the improvement made in the properties by reason of the filler is at the expense of other properties, which is often the case.

In addition, the behavior of the filler is also often characteristic of the filler/elastomer or filler/plastic pair, for reasons which are related to the morphology of the filler, and the polymer matrix, and surface chemistry. Thus, certain generally accepted laws have been more or less properly verified. However, with the conventional fillers, in certain instances it has been found that a coarser filler displays better dispersion than a finer filler.

Accordingly, considerable studies were conducted by the present applicants as to those factors likely to result in good dispersion, and in an effort to provide a filler which satisfies the requirement of good dispersibility; also to verify the benefit thereof in regard to improving certain behaviour in specific cases, albeit it will of course be appreciated that such specific instances are not to be construed as in any way limiting the present invention.

In particular, applicants' such efforts have been oriented as regards the zeolites. Indeed, it is known that the natural zeolites have already been incorporated in polypropylene; see *Natural Zeolites* by L. B. Sand and F. A. Mumpton, Pergamon Press, page 447. The results set forth in the noted publication reveal, for example, that polypropylene reinforced with a clinoptilolite filler suffers from a reduction in its impact strength.

It has also been proposed that the impact or shock properties of polypropylene might be improved with calcium carbonate-based fillers. However, any improvement achieved in regard to shock properties is quite often insufficient in relation to the requirements necessary for the particular uses intended.

SUMMARY OF THE INVENTION

It has now surprisingly been found, and which is a major object of the present invention, that the aforesaid disadvantages and drawbacks can be avoided by utilizing as the reinforcing filler, a synthetic zeolite having a small particle size.

More preferably according to the invention, the reinforcing zeolitic filler is characterized in that the mean particle size of the elementary particles closely approximates that of the secondary structure particles.

BRIEF DESCRIPTION OF THE DRAWINGS

FIG. 1 is a schematic diagram of apparatus suitable for preparing the synthetic zeolitic reinforcing fillers according to this present invention;

FIG. 2 is also a schematic diagram of apparatus suitable for preparing a synthetic zeolitic reinforcing filler according to this invention;

FIG. 5 is an electron photomicrograph of a synthetic reinforcing zeolite according to the invention;

FIG. 14 is a graph reflecting particle size versus dispersibility of another synthetic reinforcing zeolite, of type Na-P, according to the invention;

DETAILED DESCRIPTION OF THE INVENTION

Figure 3:
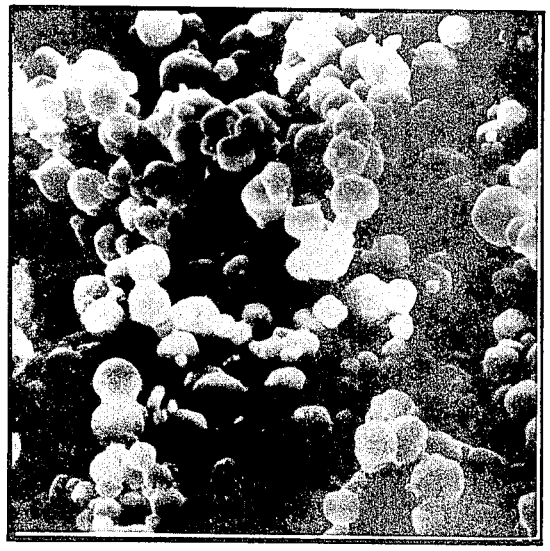
FIG. 3 is a graph reflecting particle size versus dispersibility according to the invention.

More particularly according to this invention, the mean particle sizes of the synthetic reinforcing zeolitic fillers is advantageously less than 10 $\mu$. And in an especially preferred embodiment of the invention, the granulometric distribution of said particles is over but a very narrow range.

The synthetic zeolites consistent with the invention are notably of type A, and more advantageously are of type 4A, and of type Na-P.

Also consistent with this invention, the size of the elementary particles is the apparent diameter of the particle; namely, is the diagonal of the face of a cube, or the diameter of a sphere if the particle is spherical.

The size of the secondary particles is determined by measurement with an apparatus of Coulter type, under those conditions hereinafter specified.

As hereinbefore mentioned, the difference between the two types of particles must be as small as possible. However, it should be appreciated that in accordance with the invention, in the event of reinforcement with a filler having relatively small particle sizes, namely, on the order of one micron or but a few microns, the latter may be larger in relative value, but must remain small insofar as absolute value is concerned, and most advantageously must not exceed one micron.

It too will be appreciated that those limits set forth immediately above are not absolutely critical. Indeed, same depend on the strict necessity for obtaining any particular effect or property. Accordingly, it would not be a departure from the scope of the present invention to lower the particular tolerances associated with such desired result, effect or property.

Advantageously, the filler particulates according to the invention are of a regular shape, without having sharp angles. Thus, a substantially spherical shape in the case of a zeolite 4A is a markedly desirable shape.

Also as hereinbefore mentioned, the fillers according to the invention have the property of exhibiting remarkable dispersion in polymers and in elastomers, enabling them to be widely used on a general level.

More particularly, this high level or degree of dispersibility is advantageous in the case of plastic materials such as the various polyamides.

However, a spectacular improvement in the impact strengths and properties of polypropylene was unexpectedly observed, while at the same time retaining the improvement in the bending modulus, which is due to the addition of the filler.

It too will be appreciated that the various ways of carrying out the invention and the advantages thereof are not limited to those described above.

Nonetheless, in order to further illustrate the present invention and the advantages thereof, the following specific examples are given, it too being understood that same are intended only as illustrative and in nowise limitative.

In said examples which follow, the various measurements were made in the following ways:

[1] Characterization of the zeolite (i) Determining the size of the elementary particles A double-faced adhesive strip was placed on the specimen carrier of a scanning microscope. The appropriate amount of specimen was properly placed thereon, in powder form. The specimen carrier was turned over to remove any excess powder. A carbon lacquer was coated around the powder, to provide a good contact; metalization was thus effected, and the observations were made.

An enlargement on the order of 2000 to 9000 was used to facilitate observation of the particles on a specimen having dimensions of at least $20\mu \times 20\mu$, and the size of the elementary particles was determined, by considering the apparent diameter of ten particles, which were considered as being representative of the specimen.

(ii) Determining the size of the secondary particles

This measurement was performed by means of a Coulter counter, using the following solution, by weight, as the electrolyte.

| | |
|---|---|
| Water | 78% |
| Glycerine | 20% |
| NaCl | 1% |
| Na hexametaphosphate | 0.5% |
| Formol | 0.5% |
| Dispersion, 10 min (ultrasonics) | 40000 Hertz 100 Watts |

[2] Characterization of the composite

The composites were prepared in the following manner (i) In the case of polypropylene, by cold mixing the polymer in powder form and the filler on an external Henschel mixer for a period of 15 minutes, followed by malaxation at a temperature of 80° C. for 15 minutes, in a Banbury mixer or extrusion in a single-screw or double-screw extruder.

The product, after granulation, was then injected at a temperature of 230° C. into a Monomat injection press, in order to produce small test plates.

In the case of polyamide, the mixture of granulated polyamide and filler, in powder form, was extruded in a Buss rotary and reciprocating single-screw extruder, at a temperature of 270° C., granulated and then injected at a temperature of 270° C., to also produce small test plates.

The state of dispersion in the polymer was determined using the test pieces which were molded in the above-described manner. The presence of any conglomerates of filler which may have formed was in particular, detected visually using an optical and/or electronic microscope.

(ii) In the case of polypropylene/filler systems, molded test pieces were used to evaluate the modulus of bending strength NF T 51001 and cold impact strength using the non-notched Charpy method, at a temperature of $-20°$ C. (Standard NF.T 51 035).

[3] The base polymers used were (i) Polypropylene Napryl 61200 AQ (Naphtachimie powder having a viscosity index of 110, in accordance with standards NF T 51620); and (ii) Rhone-Poulenc polyamide A 216 (Polyhexamethylene adipamide Nylon 66).

The following zeolites were used in the examples which follow.

Zeolite No. 1

The apparatus depicted in FIG. 1 of the accompanying drawings was used for the preparation thereof, thus:

A solution of sodium aluminate titrating at 110 g/l, calculated as $Na_2O$, and 150 g/l, calculated as $Al_2O_3$, was cooled to 0° C. in the tubular exchanger 1, at a rate of flow of 10 l/h. The cooled stream was continuously mixed with a flow 3 of 4 l/h of a sodium silicate solution, which was at a temperature of 20° C. and which titrated at 25% of $SiO_2$ and 11.6% of $Na_2O$ by weight, in a stirred reaction vessel 2.

The homogenous mixture, the temperature of which was in the vicinity of 12° C., was fed by means of a peristaltic pump 4 to an injector 5 having capillaries which were 0.5 mm in diameter, to continuously form drops which fall by gravity into the upper section of a reaction vessel 6 filled with petroleum maintained at a temperature of 85° C. by circulation of heated brine introduced via line 7 into the jacket.

The specific gravity of the bath was adjusted such that the mean time taken for the drops formed by the capillaries to fall through the bath was 3 seconds. At the end of that period of time, the spherical particles were gelled and were gradually converted into a fluid aluminosilicate which collected in the conical section 9 of the reaction vessel 6. The suspension was continuously drawn off by means of a suction pipe 8 at the rate of 14 l/h, after 2 hours of continuous supply of the reactants, in order to circumscribe a mean residence time for the reactants in the reaction vessel of 2 hours.

In this example, the concentration in respect of crystalline sodium aluminosilicate in the suspension of microcrystals was approximately 340 g/l, with the liquid phase which was virtually free of $SiO_2$ titrating 76 g/l of $Na_2O$ and 12 g/l of $Al_2O_3$. The resulting suspension of microcrystals was drained and washed on a filter having a mean orifice size of $1\mu$. The washed cake was then dried to constant weight in drying oven at a temperature of 100° C., before analysis.

The resulting particulate product had a uniform mean granulometry of $3\mu$ and the following grain size distribution:

| % of particles | | |
|---|---|---|
| | $<1\mu$ | 2% |
| | $<2\mu$ | 20% |
| | $<5\mu$ | 92% |
| | $<10\mu$ | 98% |

Zeolite No. 2

A solution of sodium aluminate, containing 219.5 g of aluminate, was dissolved in 757.3 g of a 10 g/l NaOH solution and was cooled to a temperature of $-5°$ C. in a tubular reactor 1, at a flow rate of 10 l/h. The cooled flow was continuously mixed with a flow 3 of 4 l/h of solution of sodium silicate, which was at a temperature of 20° C. and which titrated 26.9% of $SiO_2$ and 39.46% of $Na_2O$ by weight, in a stirred reaction vessel 2.

Operation was as in Example 1, but the temperature of the mixture was 15° C. and the mean residence time of the reactants was 2 hours, 15 minutes.

The conditions of this Example reflect an initial system as follows:

| | | |
|---|---|---|
| $SiO_2/Al_2O_3$ | = | 2.00 |
| $Na_2O/SiO_2$ | = | 1.19 |
| $H_2O/Na_2O$ | = | 26.00 |

Upon completion of the reaction, it was found that the mother liquor contained 70 g/l of $Na_2O$, 2.6 g/l of $SiO_2$ and 3.0 g/l of $Al_2O_3$.

The theoretical yield:

$$\frac{\text{Theoretical weight of anhydrous zeolite}}{\Sigma \text{ starting materials}}$$

was 19%.

The chemical formula of the resulting product was $1.06\ Na_2O,\ Al_2O_3,\ 2.04\ SiO_2$.

The X-ray spectrum thereof was characteristic of a zeolite type of 4A.

The granulometry, measured with the Coulter counter, evidenced a mean diameter for the crystalline of $3.6\mu$.

The grain size distribution was as follows:

| Diameter > | % by weight |
|---|---|
| $15\mu$ | 2.5 |
| $10\mu$ | 4 |
| $5\mu$ | 22 |
| $3\mu$ | 68 |
| $2\mu$ | 93 |
| $1\mu$ | 98 |

Zeolite No. 3

The operating procedure was the same as for zeolite No. 1.

A solution of sodium aluminate, which titrated 200 g/l calculated as $Na_2O$ and 200 g/l calculated as $Al_2O_3$, was cooled to a temperature of $-4°$ C. in a tubular exchanger 1 at a rate of flow of 10 l/h. The cooled flow was continuously mixed with a flow 3 of 4 l/h of a solution of sodium silicate, which was at a temperature of 20° C. and which titrated 25.4% of $SiO_2$ and 7.4% of $Na_2O$ by weight, in the stirred reaction vessel 2.

The other conditions were otherwise identical, except for the temperature of the mixture which was 15° C. and the residence time in the reaction vessel which was 1 hour.

The suspension which was drawn off was then drained and washed.

The resulting product had a uniform mean granulometry of $1.5\mu$, with the following distribution:

| % of particles | | |
|---|---|---|
| | $<1\mu$ | 20% |
| | $<2\mu$ | 68% |
| | $<5\mu$ | 95% |
| | $<10\mu$ | 98% |

Zeolite No. 4

This zeolite was prepared in accodance with the technique described in U.S. Pat. No. 4,263,266.

The apparatus used, as depicted in FIG. 2, comprised a reaction vessel 10 and a venturi tube 11, by means of which the reactants were brought into contact with each other.

The silicate solution was introduced by means of a pipe inlet 12 while the aluminate solution or the recycled liquor was introduced by way of a pipe arrangement 13 which was associated with a circulating pump 14 when employs a recycle of the liquor from the reaction vessel 1, in which all or a portion of the aluminate was charged at the beginning of the operation.

The cylindrical portion of the ventiru tube had an inside diameter of 14 mm. The solution and the operating conditions, in particular. the conditions of the rates of flow, were determined such as to give high Reynolds numbers, on the order of 100000, in the cylindrical portion of the apparatus.

Utilizing a decomposed Bayer process liquor, having a specific gravity of 1.27, containing 100 g/l of $Al_2O_3$ and 182 g/l of $Na_2O$ in total, 2 m$^3$ of dilute solution were prepared, which were added to a 3 m$^3$ reaction vessel which was stirred (by a screw), in a concentration of 64 g/l of $Al_2O_3$ and 111 g/l of $Na_2O$ in total, including 15.4 g/l of $Na_2O$ in carbonate form.

500 l of silicate, with 92 g/l of $Na_2O$ and 199 g/l of $SiO_2$, were added at a temperature of 75° C., over a period of 45 minutes, in a venturi, while recycling 10 m$^3$ of the aluminate solution. The resulting gel had a loss upon firing of 84.4%. Crystallization was then carried out at a temperature of 81° C., for a period of 2 hours.

The mean diameter of the resultant zeolite was 3.6μ.

Zeolite No. 5

The method of producing this zeolite was the same as the method of producing the zeolite No. 2, except that the medium reflected the following molar ratios:

| | | |
|---|---|---|
| SiO₂/Al₂O₃ | = | 2.0 |
| Na₂O/SiO₂ | = | 1.30 |
| H₂O/Na₂O | = | 25 | and same was dried without preliminary draining or filtering, resulting in a mean grain size of 11μ.

EXAMPLE 1

In this Example, the test measurements were carried out on polypropylene matrix, one being a test without any filler, and one utilizing a filler comprising a natural calcium carbonate having a mean diameter of 1μ, and the remaining tests employing the five zeolites referred to above.

The table set forth below also reports, in microns, the sizes of the primary and secondary particles of the various zeolites used, and also provides an evaluation of the degree of dispersion thereof in the polypropylene matrix.

Figure 4:
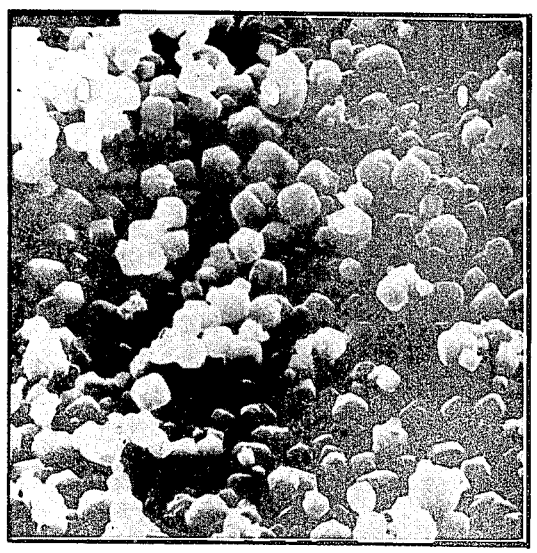
FIG. 4 is an electron photomicrograph of a synthetic reinforcing zeolite acccording to the invention.
Figure 6:
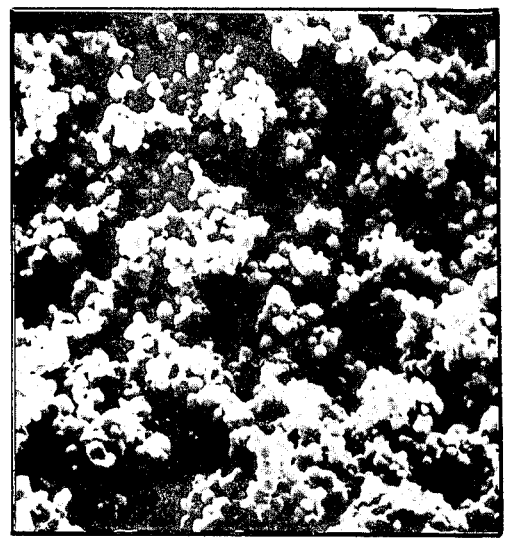
FIG. 6 is an electron photomicrograph of a synthetic reinforcing zeolite according to the invention.
Figure 7:
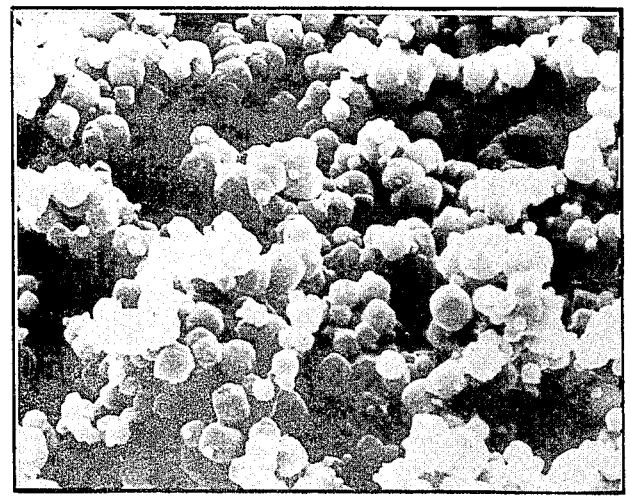
FIG. 7 is an electron photomicrograph of a synthetic reinforcing zeolite according to the invention.
Figure 8:
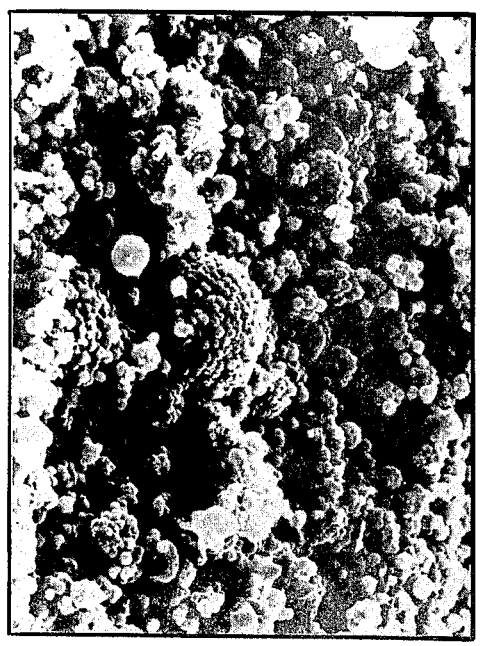
FIG. 8 is an electron photomicrograph of another synthetic reinforcing zeolite.
Figure 13:
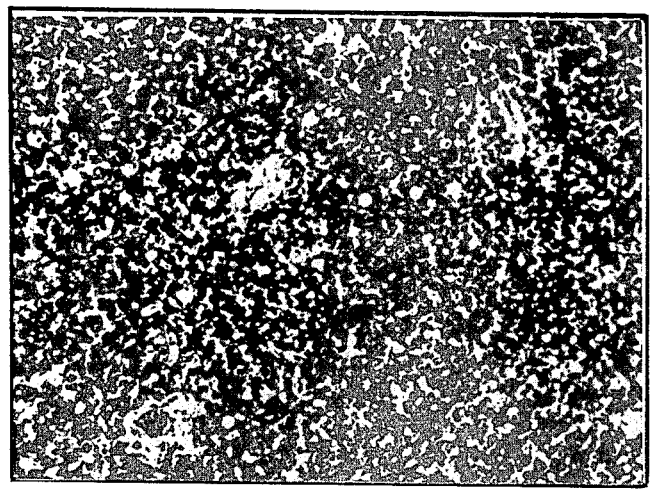
FIG. 13 is an electron photomicrograph of a polypropylene matrix reinforced with the synthetic zeolite of FIG. 8.
Figure 9:
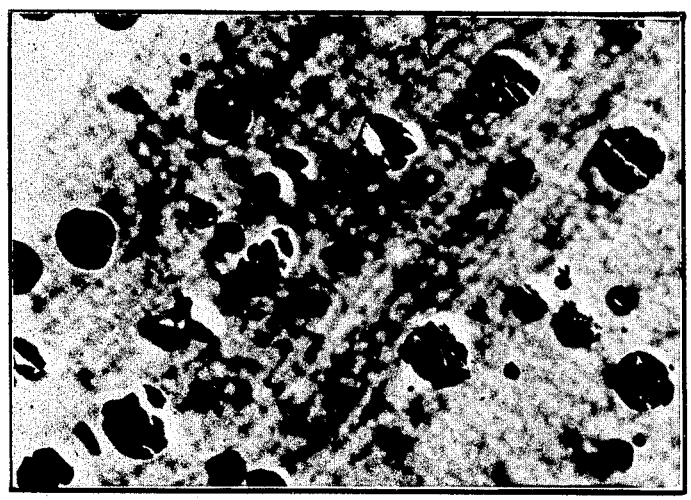
FIG. 9 is an electron photomicrograph of a polypropylene matrix reinforced with the synthetic zeolite of FIG. 4.
Figure 10:
FIG. 10 is an electron photomicrograph of a polypropylene matrix reinforced with the synthetic zeolite of FIG. 5.
Figure 11:
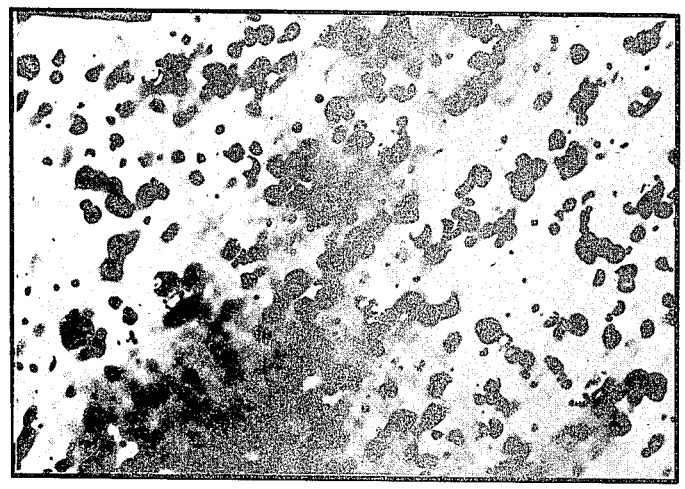
FIG. 11 is an electron photomicrograph of a polypropylene matrix reinforced with the synthetic zeolite of FIG. 6.
Figure 12:
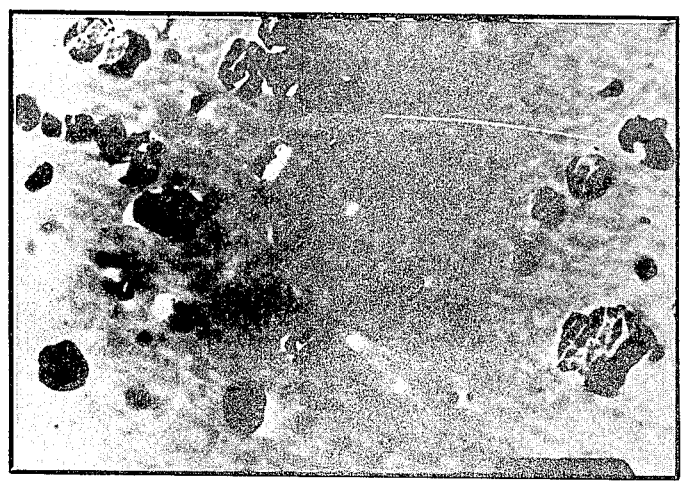
FIG. 12 is an electron photomicrograph of a polypropylene matrix reinforced with the synthetic zeolite of FIG. 7.

FIG. 3 of the drawings also illustrates the different granulometric curves, curves 1, 2, 3, 4 and 5, respectively corresponding to the granulometries of the zeolites Nos. 1, 2, 3, 4 and 5, while Figures 4 to 13 reflect the appearance of the zeolites and the dispersion thereof in the polypropylene matrix, under an electronic scanning microscope, i.e.:

| | |
|---|---|
| FIG. 4 | zeolite 1 |
| FIG. 5 | zeolite 2 |
| FIG. 6 | zeolite 3 |
| FIG. 7 | zeolite 4 |
| FIG. 8 | zeolite 5 |
| FIG. 9 | zeolite 1 in polypropylene |
| FIG. 10 | zeolite 2 in polypropylene |
| FIG. 11 | zeolite 3 in polypropylene |
| FIG. 12 | zeolite 4 in polypropylene |
| FIG. 13 | zeolite 5 in polypropylene |

TABLE

| Nature of the filler | GRANULO-METRY OF (in μ) | | Dispersion | Parts by weight | Cold impact strength, kj/m² | Bending modulus, in mega pascal MPa |
|---|---|---|---|---|---|---|
| | Primary particles | Secondary particles | | | | |
| Ca Carbonate | | | D | 30 | 16 | 1950 |
| Zeolite 1 | 2.9 | 2.8 | D | 30 | 28 | 2020 |
| Zeolite 2 | 3.5 | 3.6 | D | 30 | 28 | 2025 |
| Zeolite 3 | 1.1 | 1.5 | D | 10 | 18 | 1600 |
| Zeolite 4 | 2.9 | 3.5 | D | 30 | 28 | 2050 |
| Zeolite 5 | <3 | 11 | ND | 30 | 7 | 1980 |
| Reference polypropylene, without filler | | | | | 11 | 1350 |

D = good filler dispersion
ND = filler not dispersed

EXAMPLE 2

This Example did not employ a zeolite of type 4A, but rather a zeolite of type Na-P, which was produced under the following conditions:

| | | |
|---|---|---|
| Reaction medium: | SiO₂/Al₂O₃ | = 5 |
| | Na₂O/SiO₂ | = 0.7 |
| | Na₂O/Al₂O₃ | = 3.5 |
| | H₂O/SiO₂ | = 21 |

Temperature 92° C.

Time: 4 hours

Figure 15:
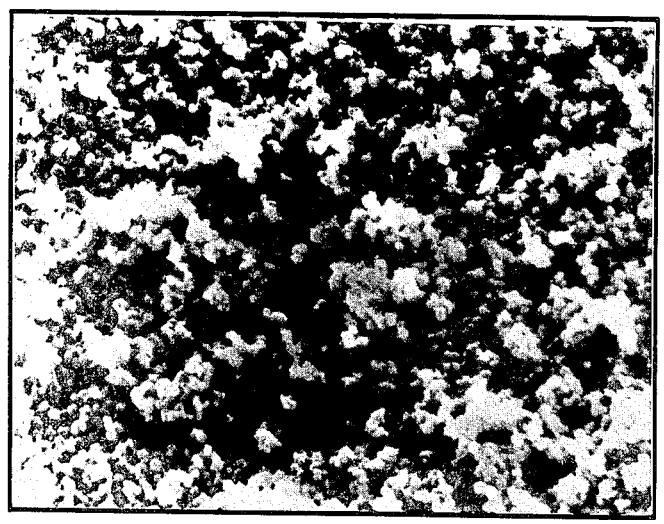
FIG. 15 is an electron photomicrograph of said another synthetic reinforcing zeolite, of type Na-P, according to the invention.
Figure 16:
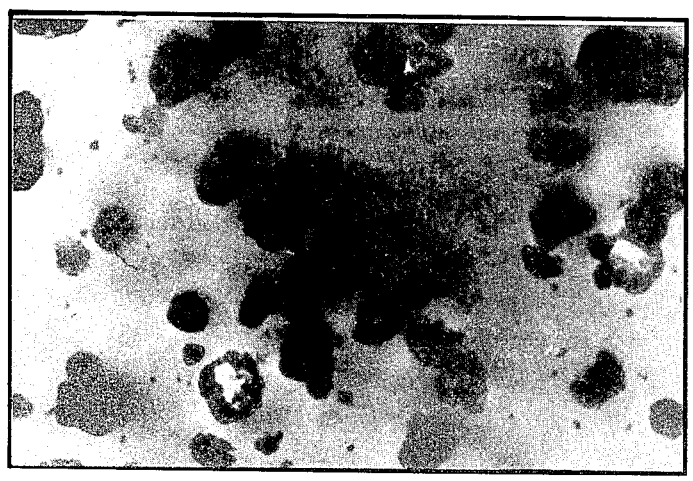
FIG. 16 is an electron photomicrograph of a polypropylene matrix reinforced with the synthetic zeolite of FIG. 15.

The results of this Example are illustrated in FIG. 14 with respect to granulometry; FIG. 15 shows the zeolite, per se, and FIG. 16 shows the zeolite dispersed in a polypropylene matrix.

EXAMPLE 3

Figure 17:
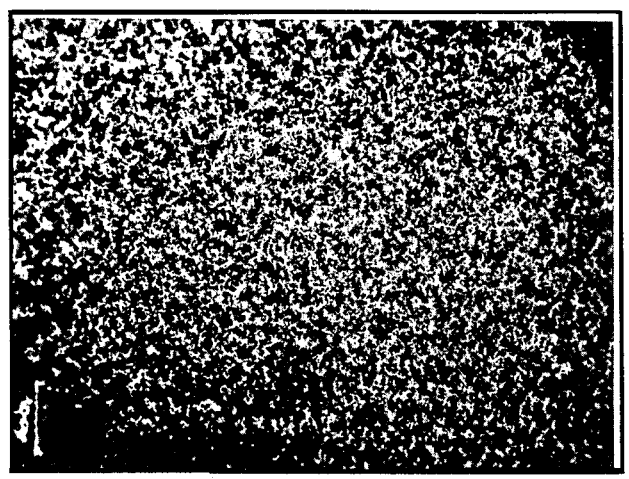
FIG. 17 is an electron photomicrograph of a nylon 66 matrix reinforced with the synthetic zeolite of FIG. 4.
Figure 18:
FIG. 18 is also an electron photomicrograph of a nylon 66 matrix reinforced with the synthetic zeolite of FIG. 4.
Figure 19:
FIG. 19 is an electron photomicrograph of a nylon 66 matrix reinforced with the synthetic zeolite of FIG. 8.
Figure 20:
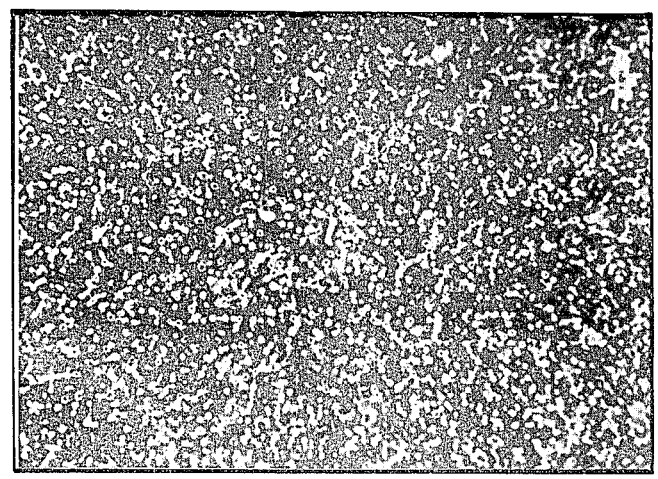
FIG. 20 is also an electron photomicrograph of a nylon 66 matrix reinforced with the synthetic zeolite of FIG. 8.

Recognizing that effecting an advanced state of dispersion in polyamide 66 is the first step for attaining improved mechanical properties by surface treatment of the fillers, it was found that the zeolites according to the invention (zeolite No. 1), when reinforcing a polyamide 66 (A 216 of Rhone-Poulenc Technyl), in a proportion of 30%, displays this property, unlike the zeolite No. 5 which, as regards a polypropylene matrix, does not have such capacity for dispersion, under the noted conditions of transformation (with FIGS. 17 and 18 reflecting the dispersion of the zeolite No. 1 in a polyamide matrix, and the FIGS. 19 and 20 reflecting the dispersion of the zeolite No. 5 in polyamide 66).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composite article of manufacture comprising a polypropylene matrix reinforced with a reinforcing amount of synthetic zeolitic filler particulates, the mean size of the elementary particles comprising said zeolitic filler particulates being on the order of that of the secondary particles of said zeoliitic filler particulates, said zeolitic filler particulates being highly dispersed in said polypropylene matrix, said composite article of manufacture having an impact strength greater than that of the corresponding composite article of manufacture comprising unfilled polypropylene matrix.

2. The composite as defined by claim 1 said reinforcing synthetic zeolitic particulates having a mean particle size of less than 10 microns.

3. The composite as defined by claim 2, the difference in mean particle sizes between said elementary and secondary particles comprising said reinforcing synthetic zeolitic particulates being no greater than about 1 micron.

4. The composite as defined by claim 3, said reinforcing synthetic zeolitic particulates having a mean particle size no greater than about 3.6 microns.

5. The composite as defined by claim 4, said reinforcing synthetic zeolitic particulates having a mean particle size on the order of about 1 micron.

6. The composite as defined by claim 3, said reinforcing synthetic zeolitic particulates being essentially spherical.

7. The composite as defined by claim 3, said reinforcing synthetic zeolitic particulates being essentially cubical.

8. The composite as defined by claim 3, said reinforcing synthetic zeolitic particulates being of type A.

9. The composite as defined by claim 3, said reinforcing synthetic zeolitic particulates being of type 4A.

10. The composite as defined by claim 3, said reinforcing synthetic zeolitic particulates being of type Na-p.

11. A composite article of manufacture as defined by claim 1, comprising a polypropylene matrix reinforced with at least about 10 percent by weight of synthetic zeolitic filler particulates, the mean size of the elementary particles comprising said zeolitic filler particulates being on the order of that of the secondary particles of said zeolitic filler particulates, said zeolitic filler particulates being highly dispersed in said polypropylene matrix, said composite article of manufacture having an impact strength greater than that of the corresponding composite article of manufacture comprising unfilled polypropylene matrix.

12. A composite article of manufacture as defined by claim 1, comprising a polypropylene matrix reinforced with from about 10 to about 30 percent by weight of synthetic zeolitic filler particulates, the mean size of the elementary particles comprising said zeolitic filler particulates being on the order of that of the secondary particles of said zeolitic filler particulates, said zeolitic filler particulates being highly dispersed in said polypropylene matrix, said composite article of manufacture having an impact strength greater than that of the corresponding composite article of manufacture comprising unfilled polypropylene matrix.

* * * * *